(12) United States Patent
Lakshmanamurthy et al.

(10) Patent No.: US 7,313,140 B2
(45) Date of Patent: Dec. 25, 2007

(54) METHOD AND APPARATUS TO ASSEMBLE DATA SEGMENTS INTO FULL PACKETS FOR EFFICIENT PACKET-BASED CLASSIFICATION

(75) Inventors: Sridhar Lakshmanamurthy, Sunnyvale, CA (US); Charles E. Narad, Los Altos, CA (US); Lawrence B. Huston, San Jose, CA (US); Yim Pun, Saratoga, CA (US); Raymond Ng, Fremont, CA (US); Debra Bernstein, Sudbury, MA (US); Mark B. Rosenbluth, Uxbridge, MA (US)

(73) Assignee: Intel Corporation, Santa Clara, CA (US)

(*) Notice: Subject to any disclaimer, the term of this patent is extended or adjusted under 35 U.S.C. 154(b) by 1054 days.

(21) Appl. No.: 10/188,087

(22) Filed: Jul. 3, 2002

(65) Prior Publication Data

US 2004/0004964 A1    Jan. 8, 2004

(51) Int. Cl.
    *H04L 12/28* (2006.01)
(52) U.S. Cl. .............. 370/394; 370/395.7; 370/412
(58) Field of Classification Search ............. None
    See application file for complete search history.

(56) References Cited

U.S. PATENT DOCUMENTS

| | | | |
|---|---|---|---|
| 6,757,791 B1* | 6/2004 | O'Grady et al. | 711/154 |
| 6,963,572 B1* | 11/2005 | Carr et al. | 370/401 |
| 6,985,454 B1* | 1/2006 | Wiedeman et al. | 370/316 |
| 2002/0026502 A1* | 2/2002 | Phillips et al. | 709/219 |
| 2002/0154646 A1* | 10/2002 | Dubois et al. | 370/406 |
| 2002/0163914 A1* | 11/2002 | Dooley | 370/394 |
| 2003/0026206 A1* | 2/2003 | Mullendore et al. | 370/230 |

* cited by examiner

*Primary Examiner*—Chau Nguyen
*Assistant Examiner*—Jung Park
(74) *Attorney, Agent, or Firm*—Grossman, Tucker, Perreault & Pfleger, PLLC

(57) ABSTRACT

A method may be used for assembling received data segments into full packets in an initial processing stage in a processor. The method may include receiving a plurality of data segments from a packet and determining a first storage location for each of the plurality of data segments. The method may further include storing each of the plurality of data segments in its determined first storage location and determining a second storage location for each of the plurality of data segments, the second storage locations being logically ordered to represent the order the data segments originally occurred in the packet. The method may also include storing each of the plurality of data segments in its determined second storage location to re-assemble the packet and releasing the first storage location associated with each data segment after storing the data segment in its determined second storage location. The method may additionally include, upon the storing of an end of packet data segment from the packet in its determined second storage location, passing control of the plurality of related data segments to a next processing stage in the processor.

20 Claims, 7 Drawing Sheets

METHOD AND APPARATUS TO ASSEMBLE DATA SEGMENTS INTO FULL PACKETS FOR EFFICIENT PACKET-BASED CLASSIFICATION

FIELD OF THE INVENTION

Processor architectures, and in particular, processor architectures that assemble data segments into full packets for efficient packet-based classification.

BACKGROUND

In the Internet Protocol (IP), Internet Protocol, Version 6 (Ipv6) Specification, RFC 2460, published December 1998, packet world, most routers deal with entire IP packets to perform route look-up (LPM), 5-tuple lookup, provide quality of service (QoS), perform scheduling, and to do other tasks, such as metering and so on. Unfortunately, the physical interface supported by today's framing devices is not wide enough to move an entire variable sized from the framing device to the network processor in one contiguous transfer. As a result, each packet must be broken up into multiple data segments by the interface and passed to the network processor for processing. Therefore, a key challenge for routers is to identify a context with which each of the pieces of data that is received is associated, match each piece of data with the identified context and re-assemble the data pieces in a memory to re-construct the entire IP packet. Although not required, performing the re-assembly task prior to any of the actual work done by the network processor may simplify the packet-processing task. Thus, the effort associated with the re-assembly of the data segments into data packets defines the overhead of moving the data from the framing device to the network processor.

DETAILED DESCRIPTION

Figure 1:
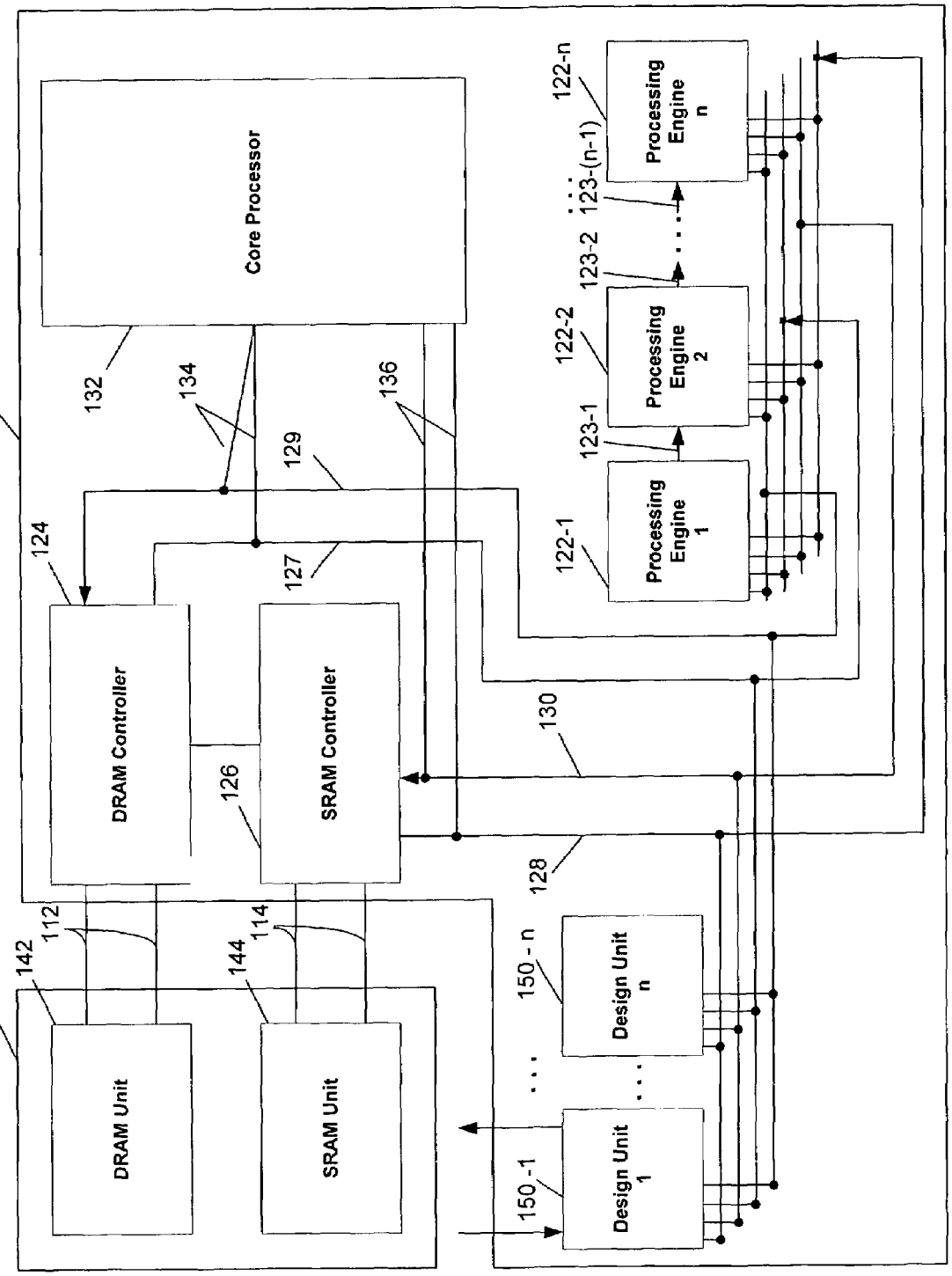
FIG. 1 is a block diagram of a processing system that includes an architectural state including one or more processors, registers and memory, in accordance with an embodiment of the present invention.

FIG. 1 is a block diagram of a processing system, in accordance with an embodiment of the present invention. In FIG. 1, a computer processor system 100 may include a parallel processor 120 coupled by a pair of memory buses 112, 114 to a memory system or memory resource 140. Memory system 140 may include a dynamic random access memory (DRAM) unit 142 and a static random access memory (SRAM) unit 144. The processor system 100 may be especially useful for tasks that can be broken into parallel subtasks or functions. Specifically, processor 120 may be useful for tasks that are bandwidth oriented rather than latency oriented. Processor 120 may have multiple processing engines or microengines (MEs) 122-1-122-$n$, where each ME may have multiple hardware controlled threads that may be simultaneously active and independently work on a specific task. For example, in accordance with an embodiment of the present invention, each processing engine 122-1-122-$n$ may have eight (8) threads.

In FIG. 1, processing engines 122-1-122-$n$ may each maintain program counters in hardware and states associated with the program counters. Effectively, corresponding sets of contexts or threads can be simultaneously active on each of processing engines 122-1-122-$n$, although only one may be actually operating at any one time. In addition, each of processing engines 122-1-122-$n$ may be coupled to their next neighbors by a plurality of next neighbor buses 123-1-123-(n−1). Similarly, although not shown in FIG. 1, processing engines 122-1-122-$n$ may be logically and/or physically organized into two or more equal groups, or clusters, while still maintaining the coupling of next neighbor buses 123-1-123-(n−1).

In FIG. 1, in accordance with an embodiment of the present invention, processing engines 122-1-122-$n$ may be implemented as eight (8), that is, n=8, processing engines on processor 120. Each processing engine 122-1-122-$n$ may have the capability to process the eight (8) hardware threads or contexts, although only one thread or context may be active at any one time. Processing engines 122-1-122-$n$ may operate with shared resources including memory resource 140 and a variety of bus interfaces. Network processor 120 may include a DRAM controller 124 and a SRAM controller 126. DRAM unit 142 and DRAM controller 124 may be used for processing large volumes of data, for example, the processing of network payloads, which, for example, may contain data segments from network packets. SRAM unit 144 and SRAM controller 126 may be used in a networking implementation for low latency, fast access tasks, for example, accessing look-up tables, core processor memory, and the like. Alternatively, in another embodiment of the present invention, network processor 120 may be implemented with sixteen processing engines 122-1-122-$n$, where n=16.

In accordance with an embodiment of the present invention, push buses 127, 128 and pull buses 129, 130 may be used to transfer data between processing engines 122-1-122-$n$ and DRAM unit 142 and SRAM unit 144. In particular, push buses 127, 128 may be unidirectional buses that may be used to move the data from memory resource 140 through DRAM controller 124 and/or SRAM controller 126 to processing engines 122-1-122-$n$. Similarly, pull buses 129, 130 may move data from processing engines 122-1-122-$n$ through DRAM controller 124 and/or SRAM controller 126 to their associated DRAM unit 142 and SRAM unit 144 in memory resource 140. Although not shown for reasons of clarity, a command bus may also be included in network processor 120, for example, to couple to processing engines 122-1-122-n, DRAM controller 124, SRAM controller 126, core processor 132 and design units 150-1-150-n.

In accordance with an embodiment of the present invention, processing engines 122-1-122-n may access either DRAM unit 142 or SRAM unit 144 based on characteristics of the data. Thus, low latency, low bandwidth data may be stored in and fetched from SRAM unit 144, whereas higher bandwidth data, for which latency is not as important, may be stored in and fetched from DRAM unit 142. Processing engines 122-1-122-n may execute memory reference instructions to either DRAM controller 124 or SRAM controller 126.

In accordance with an embodiment of the present invention, processor 120 also may include a core processor 132 for loading microcode control for other resources of processor 120. In accordance with an embodiment of the present invention, core processor 132 may be a XScale™-based architecture manufactured by Intel Corporation of Santa Clara, Calif. Core processor 132 may be coupled to DRAM controller 124 by a push/pull bus 134. Core processor 132 may also be coupled to SRAM controller 126 by a SRAM push/pull bus 136.

The core processor 132 may perform general purpose computer type functions such as handling protocols, exceptions, and extra support for packet processing where processing engines 122-1-122-n may pass the packets off for more detailed processing such as in boundary conditions. Core processor 132 may have an operating system (OS) (not shown). Through the OS, core processor 132 may call functions to operate on processing engines 122-1-122-n. Core processor 132 may use any supported OS, such as, a real time OS. In an embodiment of the present invention, core processor 132 may use, for example, operating systems such as VXWorks from Wind River International of Alameda, Calif.; μC/OS, from Micrium, Inc. of Weston, Fla. and/or a freeware OS available over the Internet.

Advantages of hardware multithreading may be explained in relation to SRAM unit 144 or DRAM unit 142 accesses. As an example, an SRAM access requested by a context (that is, a thread, from one of processing engines 122-1-122-n) may cause SRAM controller 126 to initiate an access to SRAM unit 144. SRAM controller 126 may access SRAM unit 144, fetch the data from SRAM unit 144, and return the data to the requesting thread in one of processing engines 122-1-122-n.

During an SRAM access, if one of processing engines 122-1-122-n had only a single thread that could operate, that one processing engine would be dormant until data was returned from the SRAM unit 144.

By employing hardware context (thread) swapping within each of processing engines 122-1-122-n the hardware context swapping may enable other contexts with unique program counters to execute in that same processing engine. Thus, for example, a second thread may function while a first thread may await the return of data in response to a read request. During execution, the second thread accesses DRAM unit 142. In general, while the second thread may operate on DRAM unit 142, and the first thread may operate on SRAM unit 144, a third thread, may also operate in the same one of processing engines 122-1-122-n as the first and second threads. For example, the third thread may operate for a certain amount of time until it needs to access memory or perform some other long latency operation, such as making an access to a bus interface. Therefore, processor 120 may have simultaneously executing bus, SRAM and DRAM operations that are all being completed or operated upon by one of processing engines 122-1-122-n and the one processing engine may still have one more thread available to process more work.

The hardware context swapping may also synchronize completion of tasks. For example, if two threads hit a shared memory resource, for example, SRAM unit 144, each one of the separate functional units, for example, SRAM controller 126 and DRAM controller 124, may report back a flag signaling completion of a requested task from one of the threads. Once the programming engine executing the requesting thread receives the flag, the programming engine may determine which thread to turn on.

In an embodiment of the present invention, the processor 120 may be used as a network processor. As a network processor, processor 120 may interface to network devices such as a Media Access Control (MAC) device, for example, a 10/100BaseT Octal MAC or a Gigabit Ethernet device (not shown). In general, processor 120 may interface to any type of communication device or interface that receives or sends a large amount of data. Similarly, computer processor system 100 may function in a networking application to receive network packets and process those packets in a parallel manner.

Figure 2:
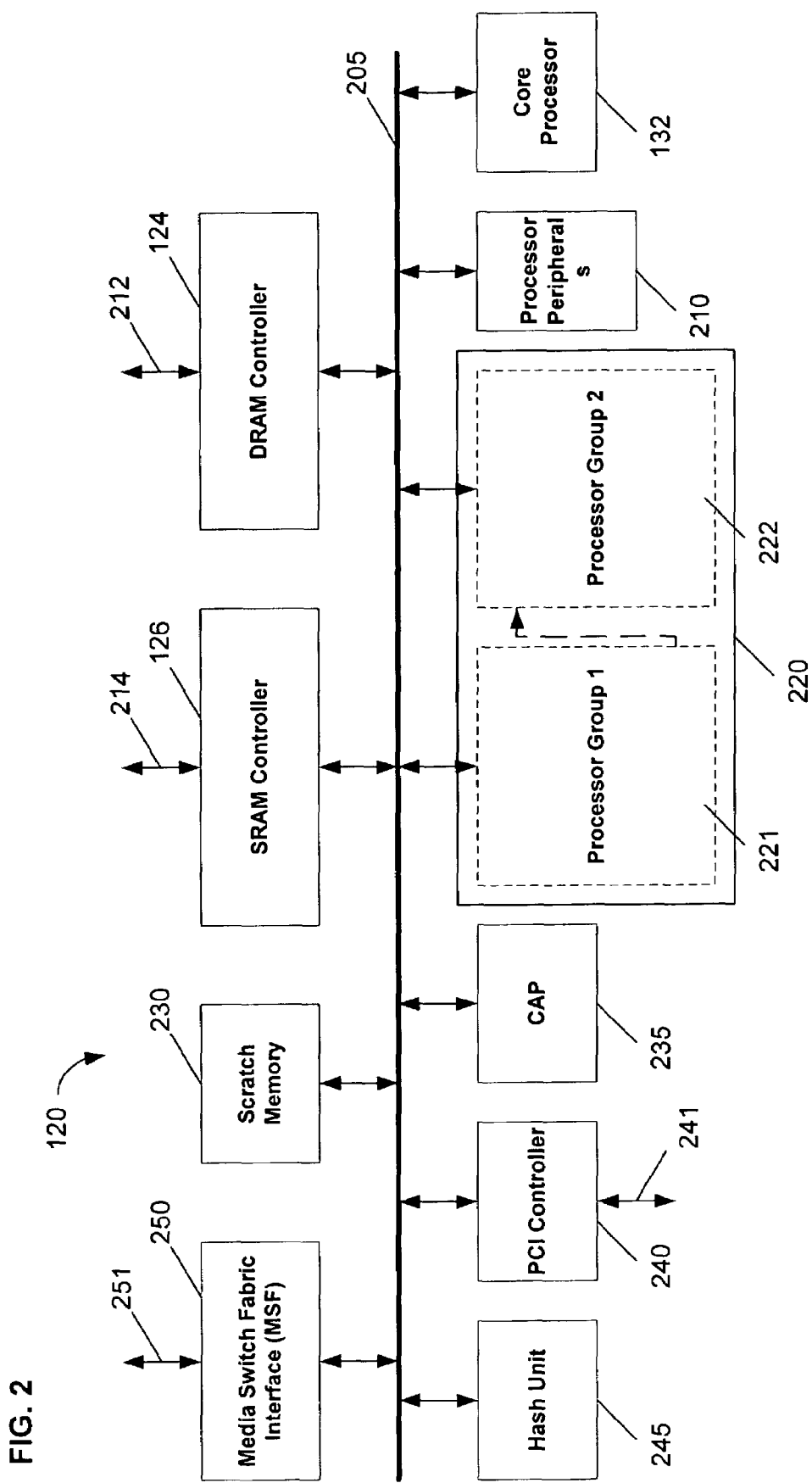
FIG. 2 is a simplified functional block diagram of an exemplary structure for the processing system of FIG. 1 having a high-performance parallel processing architecture, in accordance with an embodiment of the present invention.

FIG. 2 is a simplified functional block diagram of an exemplary structure for the processing system of FIG. 1 having a high-performance parallel processing architecture, in accordance with an embodiment of the present invention.

In FIG. 2, in accordance with an embodiment of the present invention, a processor chassis 205 may be coupled to core processor 132. Processor chassis 205 may include, for example, DRAM push and pull busses 127, 128 of FIG. 1, SRAM push and pull busses 129, 130, at least one command bus, at least one command arbiter, at least one push bus arbiter, at least one pull bus arbiter, an Advanced Peripheral Bus (APB), and a CSR Access Proxy (CAP) bus. In FIG. 2, DRAM controller 124 and SRAM controller 126 may each be coupled to processor chassis 205. DRAM controller 124 may be further coupled to DRAM memory bus 112 and SRAM controller 126 may be further coupled to SRAM memory bus 114. Likewise, a processor peripherals component 210, for example, Intel® XScale™ Peripherals (XPI), may be coupled to processor chassis 205.

In FIG. 2, in accordance with an embodiment of the present invention, a processor component 220 may be coupled to processor chassis 205 at one or more points. Processor component 220 may be implemented to include, for example, multiple processing engines (not shown) in multiple processing group clusters. Specifically, processor component 220 may include a first processor group 221 and a second processor group 222 where first processor group 221 may be coupled to second processor group 222.

In FIG. 2, in accordance with an embodiment of the present invention, a scratch memory 230, a CAP component 235, a PCI controller 240, a hash unit 245 and a media switch fabric (MSF) component 250 also may be coupled to processor chassis 205. PCI controller 240 may be further coupled to a PCI bus 241 and MSF component 250 may be further coupled to a communication channel 251, for example, an external communication channel.

In accordance with an embodiment of the present invention, Packet-over-SONET (POS); Common Switch Interface Specification (CSIX), Common Switch Interface Specification-L1, Version 1.0, published Aug. 5, 2000; and Asynchronous Transfer Mode (ATM) receive interfaces on network processor 120 can receive data for up to 16 logical ports or 64,000 Virtual Output Queues (VOQs) or 64,000

Virtual Connections (VCs) at any given time. Synchronous Optical Network (SONET) is defined in ANSI T1.105-2001, Synchronous Optical Network, published 2001. In other words, a received burst of data may belong to one of up to 64,000 contexts. Therefore, the challenge is to identify which of the contexts the received data belongs to and re-assemble the data into an appropriate buffer in DRAM. The context information may be either stored entirely in ME local memory, for example, for POS, or it may be cached in ME local memory with content addressable memory (CAM) being used to manage the cache.

There are, in general, three ways of handling the received data. First, a hardware DMA mechanism may be provided to move the data directly from the receive interface to the DRAM. Although this approach provides the fastest performance, it lacks the flexibility of being programmable. Second, a software DMA mechanism may be provided to move the data directly from the receive interface to the DRAM. Although this approach, generally, provides the slowest performance, it is be extremely flexible, since it may be completely programmable. Third, use a combination of hardware and software to implement the DMA mechanism. In general, the hardware/software implementation would be faster than the software implementation but slower than the all hardware implementation. However, the hardware/software implementation would permit the exploitation of the speed advantages of a hardware implementation and the flexibility of a software implementation.

In accordance with an embodiment of the present invention, a mechanism may be provided for doing DMA transfers from the data-receive interface directly to DRAM using a software application running on one of the microengines, for example, a first microengine in the series of microengines. The mechanism may be implemented in either software and/or hardware to be able to do this entire task.

Figure 3:
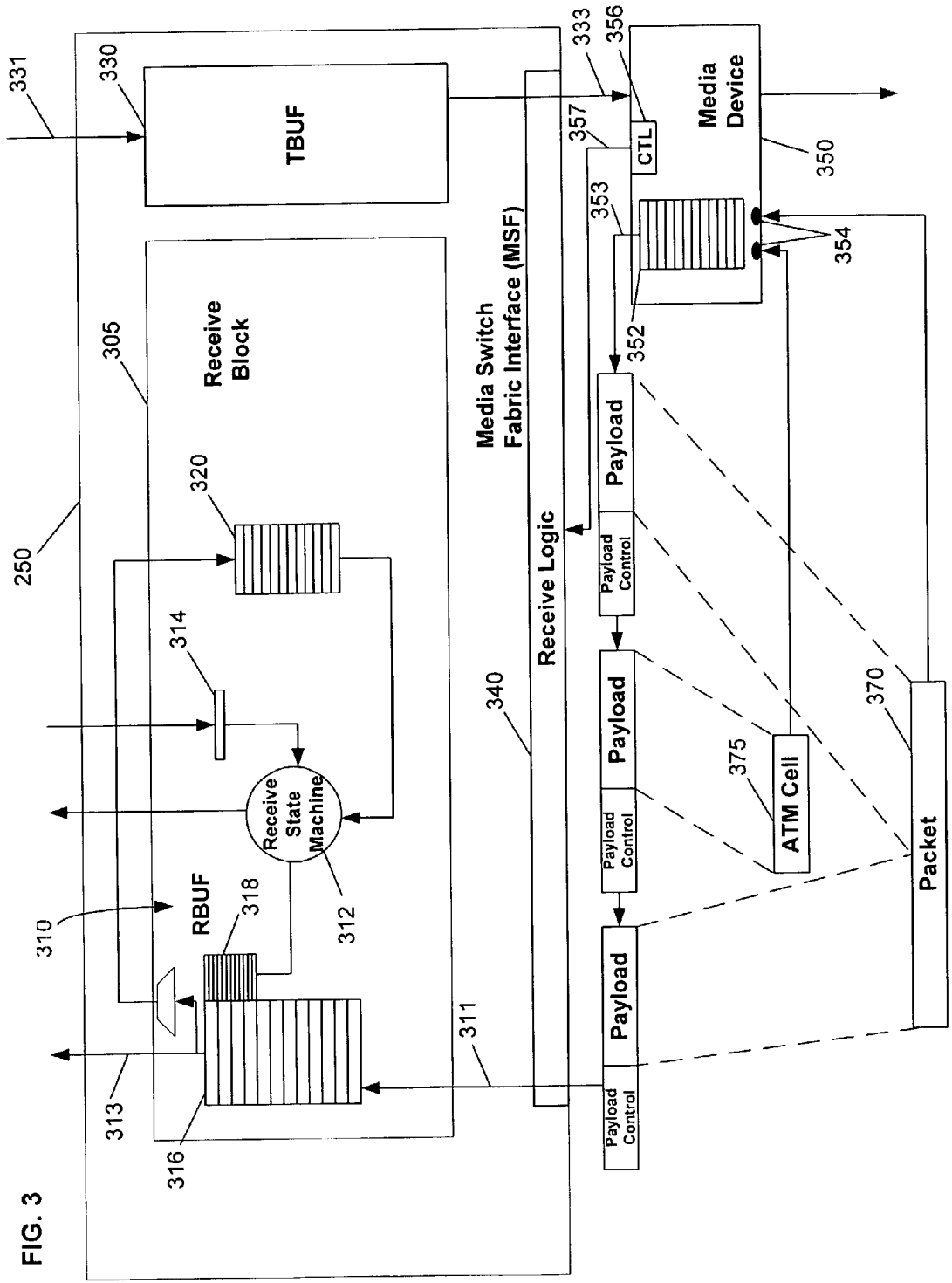
FIG. 3 is a detailed block diagram of a media/switch fabric interface (MSF) component of FIG. 2, in accordance with an embodiment of the present invention.

FIG. 3 is a detailed block diagram of MSF component 250 of FIG. 2, in accordance with an embodiment of the present invention. In FIG. 3, in accordance with an embodiment of the present invention, MSF 250 may include a receive block 305 having a receive buffer (RBUF) 310, a transmit buffer (TBUF) 330, and a receive logic unit 340. Both RBUF 310 and TBUF 330 may be coupled to separate input channels 311, 331, respectively, and separate output channels 313, 333, respectively. In the present embodiment, input channel 331 may be one of previously described push buses 127, 128 in FIG. 1 and output channel 313 may be one of previously described pull buses 129, 130.

Returning to FIG. 3, RBUF 310 may include a Receive State Machine (RSM) 312, which may be coupled to receive logic unit 340 to receive a data segment from an incoming packet (for example, either a System Packet Interface Level 3 (SPI-3), Implementation Agreement OIF-SPI3-01.0, published June 2000, or System Packet Interface Level 4 (SPI-4), Implementation Agreement OIF-SPI4-02.0, published January 2001, frame). RSM 312 may be coupled to an element freelist 314 to take an available element number from element freelist 314 and move the data segment into an element in an element storage 316 specified by the element number. Element freelist 314 may be implemented as, for example, a bit vector to represent all of the elements in element storage 316. RSM 312 may be further coupled to an element storage status component 318, which may be associated with element storage 316. RSM 312 may compile status information for the data segment in each element and store the status information in element storage status component 318. RSM 312 may also be coupled to a thread freelist 320 to obtain an available thread number for the data segment from thread freelist 320 and send (for example, autopush) the status of the data segment stored in element storage status component 318 to the thread identified by the obtained thread number. Each thread associated with a data segment, generally, may be classified as a re-assembly thread. In general, the thread may be executed on a single microengine (ME), for example, a first ME, in network processor 120 in FIG. 1.

Returning to FIG. 3, thread freelist 320 may be implemented as, for example, a first-in first-out (FIFO) queue. If RSM 312 does not receive valid data during a pre-defined time interval, a null status may be autopushed to the assigned thread on the ME. When RSM 312 fills an element in element storage 316, the element may be marked as busy and, generally, may not be re-used for additional received data until the ME thread assigned to the element places the element back onto element freelist 320. Similarly, when a thread is assigned to process the element, it, generally, may not be assigned to another task until the thread (or an agent for the thread) writes its thread number back to thread freelist 320.

In FIG. 3, in accordance with an embodiment of the present invention, media device 350 may also be coupled to one or more networks (not shown) by one or more ports 354 which may receive network packets, for example, a POS packet 370 and an ATM cell 375. In general, each port will be assigned to receive a specific type of packet, for example, POS packets or ATM cells. Media device 350 may partition each packet into data segments having a payload (data) component and a payload control component (header) and temporarily store/queue the data segments in a buffer 352. In general, buffer 352 may be implemented as a FIFO buffer. Media device 350 may also be coupled to media switch fabric 250 via a communication channel 353 to forward the data segments from buffer 352 to RBUF 310. A control 356 may be coupled to media device 350 to send a control signal to receive logic 340 for each data segment forwarded from buffer 352.

In accordance with an embodiment of the present invention, the system of FIG. 3 may be designed to minimize the number of RBUF elements required to support the incoming line rate, for example, OC-48 or OC-192. Therefore, the re-assembly ME may write all the data segments from RQBUF 310 to DRAM unit 142, including the IP header information for packets received on both POS and CSIX interfaces. Similarly, a classification ME may read the header data from DRAM when needed. In general, the classification ME may be the next neighbor to the re-assembly ME and may also decide the size of the read burst based on the application requirements. Once the re-assembly ME gets a signal that the data segment from element storage 316 in RBUF 310 has been written into DRAM 142, the re-assembly ME may free up the RBUF element by putting it back on element free list 314.

Figure 4:
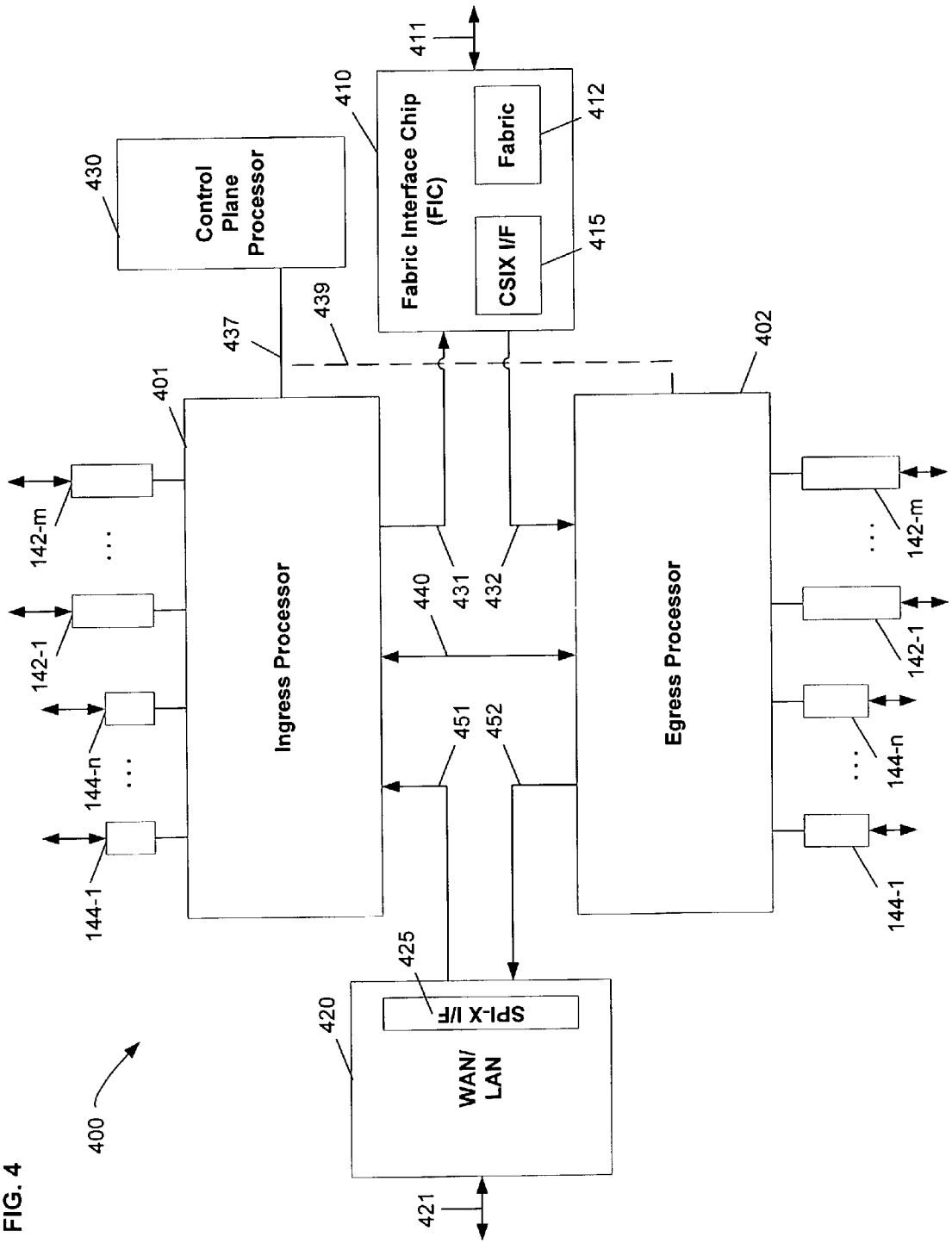
FIG. 4 is a detailed block diagram of a system for use with multiple LAN/WAN configurations that use two processing systems of FIG. 1, in accordance with an embodiment of the present invention.

FIG. 4 is a detailed block diagram of a system for use with multiple LAN/WAN configurations that use two processing systems of FIG. 1, in accordance with an embodiment of the present invention. In FIG. 4, a multiple LAN/WAN line card 400 may include a fabric interface chip (FIC) 410, which may be configured to communicate over an external network. FIC 410 may include a fabric 412, which may be configured to act as an interface between line card 400 and the external network over an external communication path 411, and a CSIX interface 415 coupled to fabric 412. CSIX interface 415 may be configured to send and receive signals within line card 400. Specifically, an ingress processor 401 and an egress processor 402 may be coupled to CSIX interface 415 by communication channels 431, 432, respectively. Ingress processor 401 and egress processor 402 may each be implemented as a processing unit, for example, processing unit 120 from FIG. 1.

Returning to FIG. 4, ingress processor 401 and egress processor 402 may be coupled to each other by a communication-bus (c-bus) 440, which may provide inter processor communication. Ingress processor 401 may also be coupled to at least one DRAM 142-1-142-m and at least one SRAM 144-1-144-n. Similarly, egress processor 402 may be coupled to at least one DRAM 142-1-142-m and at least one SRAM 144-1-144-n. In accordance with embodiments of the present invention, in general, although identified in FIG. 4 by the same reference numbers, at least one DRAM 142-1-142-m and at least one SRAM 144-1-144-n connected to ingress processor 401 and at least one DRAM 142-1-142-m and at least one SRAM 144-1-144-n egress processor 402 may be implemented as different physical memory structures. For example, the DRAM that ingress processor 401 may be connected to may be a totally different memory than the DRAM to which egress processor 402 may be connected. However, it may also be that both ingress processor 401 and egress processor 402 may be connected to the same DRAM memory.

In FIG. 4, a group of LAN/WANs 420 may be coupled to ingress processor 401 and egress processor 402 over SPI-X I/F buses 451, 452, respectively, through SPI-X I/F 425, for example, SPI-3 I/F or SPI-4 I/F.

In FIG. 4, in accordance with an embodiment of the present invention, a control plane processor 430 may be coupled to ingress processor 401 by a first control plane processor bus 437 and control plane processor 430 may be coupled to egress processor 402 by a second control plane processor bus 439 (shown in shadow line), for example, PCI buses. Alternatively, in another embodiment of the present invention, control plane processor 430 may only be coupled to ingress processor 401 by first control plane processor bus 437.

In accordance with an embodiment of the present invention, the re-assembly code may be similar for the ingress and egress processors. As an optimization for the POS interface, which may support only 16 logical ports, it may be possible to keep the TCP/IP header portion in RBUF 310 without having to move it to DRAM unit 142. As a result, the classification stage may read the information from RBUF 310 instead of from DRAM unit 142. On the flip side, this puts pressure on the available RBUF elements. Unfortunately, this scheme does not work for CSIX or ATM interfaces where the number of logical ports supported may be up to 64,000.

In accordance with an embodiment of the present invention, the present embodiment may implement the re-assembly as a context pipeline on a single ME running 8 threads. Each thread on the single ME may handle the re-assembly of 1 RBUF element and, in order to meet the line rate performance for min POS packets, the processing of each RBUF element must be completed before the n+1 RBUF element is received, where n is the total possible number of threads on the ME. Therefore, the number of ME processing cycles required to re-assemble each RBUF element may be defined by: # of Threads per ME*# of cycles required to process each RBUF element. If the total instruction budget for processing each RBUF element is 88 ME cycles, then the total latency (to account for all memory ops) 8 * 88 ME cycles=704 ME cycles. In other words, for the system to keep up with the line rate, thread 0 must be done with processing of element 0 by the time element 8 arrives into the system.

In accordance with an embodiment of the present invention, for a POS/SPI-3 interface receive, the receive status word provides all the information that is required to determine which of the logical ports the current data element belongs to. For example, an embodiment of the present invention may only support 16 logical ports on the SPI-3 interface, the assumption may be made that the entire re-assembly context for each of the 16 ports may be resident in the local memory of the frame re-assembly ME, that is, the entire re-assembly context fits within 640 4-byte (32-bit) words. This assumption greatly simplifies the re-assembly task. Alternatively, in another embodiment, similar functionality may be achieved for a POS/SPI-4 interface with up to 256 or more ports.

In FIG. 4, for the interface between CSIX interface 415 and egress processor 402, each data element that is received may belong to any one of up to 64,000 contexts (or VOQs). As a result, the re-assembly contexts have to be resident in SRAM 144-1-144-n coupled to egress processor 402 and the thread must be able to read in the relevant context to update it for the current data being received. Techniques to accelerate and optimize the performance of the read modify write critical section may be employed using the CAM in the ME on egress processor 402 in conjunction with the local memory to cache the 16 most recently used re-assembly context states.

Another issue that may make CSIX re-assembly complex is that the entire RE-ASSEMBLY key may not be part of the receive status word. In general, the thread that handles the element has to issue an additional read to the RBUF element (not shown) on egress processor 402 to get complete information. In accordance with an embodiment of the present invention, the size of this pre-pend header may be, for example, 8 bytes, although it may also be more or less, in alternative embodiments. The pre-pend header information may be computed by the classification stage of the ingress processor and may contain a fabric source port identification, a destination L2 port identification, classification results, etc. The transmission (TX) processing stage of the ingress pipeline of ingress processor 401 may append the pre-pend header to every cframe sent out of ingress processor 401. In the re-assembly stage in egress processor 402, the relevant CSIX re-assembly context may be determined based on the pre-pend header information and the class identification information received in the cframe extension header, which may be forwarded as part of the receive status word.

Therefore, in FIG. 4, for POS frame re-assembly on ingress processor 401, the re-assembly context search may be a simple index lookup into the ME local memory using the port # as the offset. For CSIX re-assembly on egress processor 402, the re-assembly thread may perform a CAM lookup using the RE-ASSEMBLY KEY. A CAM hit may indicate that the re-assembly state is already in local memory, that is, it was previously fetched and used by another thread. Conversely, on a CAM miss, the thread must evict the returned LRU re-assembly state from local memory, write it back to the SRAM, read the required re-assembly state from the SRAM and update the CAM entry to reflect this operation.

Figure 5:
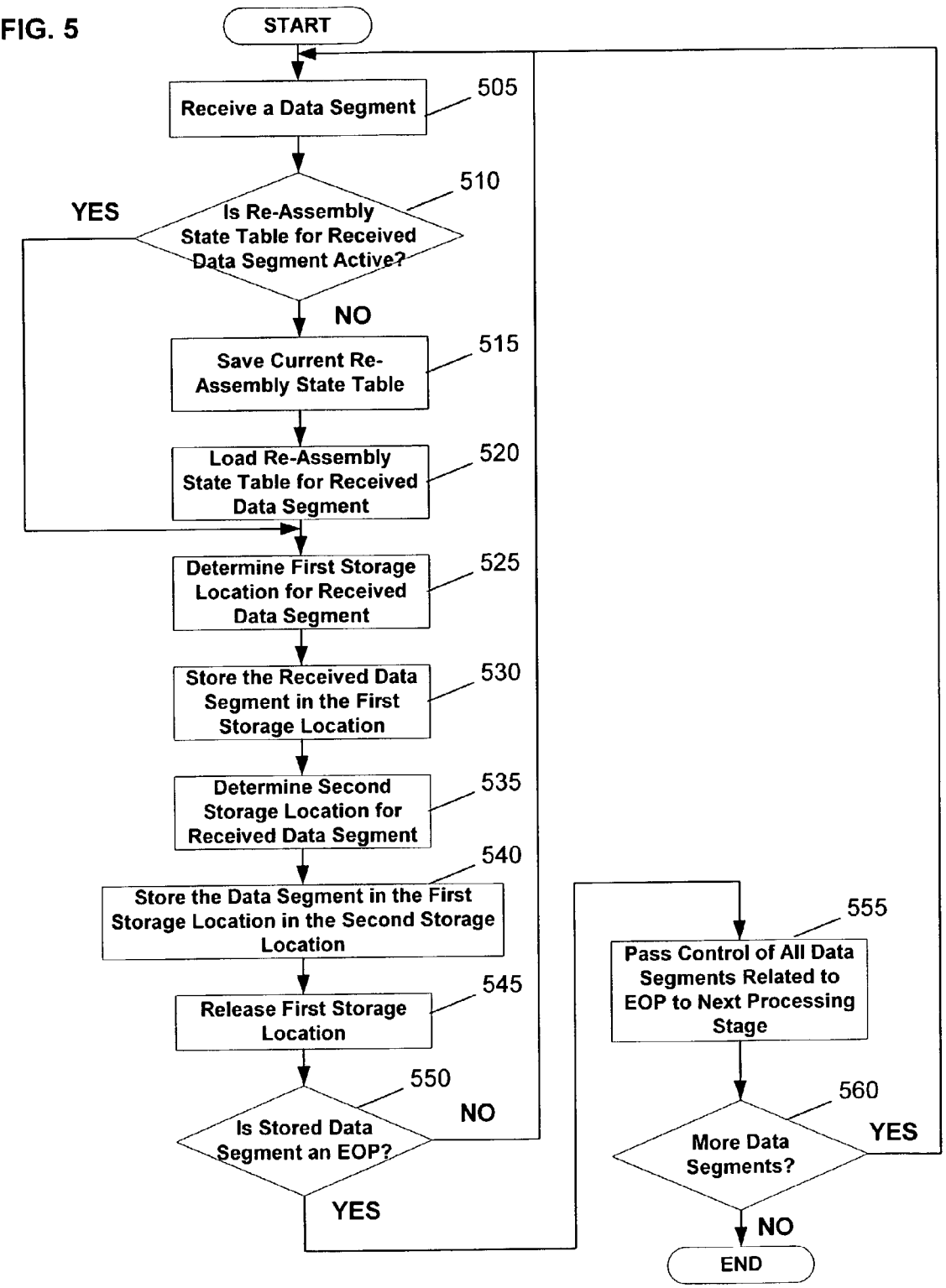
FIG. 5 is a detailed flow diagram of a method of assembling received data segments into full packets in an initial processing stage in a processing system, in accordance with an embodiment of the present invention.

FIG. 5 is a detailed flow diagram of a method of assembling received data segments into full packets in an initial processing stage in a processing system, in accordance with an embodiment of the present invention. In FIG. 5, a data segment of a packet may be received 505 in RBUF 310 from, for example, media device 350. As described above, the source packets can be of multiple types, for example, POS packets and ATM cells. Whether a re-assembly state table associated with the received data segment is active may be determined 510 in the ME local memory. If it is determined that the re-assembly state table for the received data segment is not active in the ME local memory, the current re-assembly state table may be saved 515 to SRAM 144, and the re-assembly state table for the received data segment may be loaded 520 into the ME local memory and made active. If the re-assembly state table for the received data segment was active, the saving operation 515 and loading operation 520 just described need not be performed.

In FIG. 5, a first storage location in RBUF 310 for the received data segment may be determined 525 and the received data segment may be stored 530 in the first storage location. In general, the first storage location will only be used as a temporary storage location. A second storage location for the received data segment may be determined 535, for example, in DRAM 142, and the received data segment may be stored 540 in the second storage location. In general, where the received data segment may be stored in the second storage location may be determined using the re-assembly state table for the received data segment so as to re-assemble the received data segment in its original position in the packet. The first storage location may be released 545 and made available for use to store new data segments. Whether the received data segment just stored in the second storage location may be marked to indicate that it represents an end-of-packet (EOP) may be determined 550. For example, it may be determined 550 if an EOP bit is set in the received data segment to indicate that the received data segment is the last data segment in the packet. If it is determined 550 that the received data segment is not the EOP, the thread re-assembling this packet may continue to receive 525 new data segments. If it is determined 550 that the data segment is the EOP, control of all of the EOP and all re-assembled data segments may be passed 555 to the next processing stage. For example, in accordance with an embodiment of the present invention, control may be passed 555 to the next processing stage on a next neighbor ME to continue processing with the re-assemble packet. Either as part of passing 555 control to the next processing stage or subsequently, the ME may release the thread assigned to re-assemble the data segments for the packet that was just passed 555 to the next processing stage.

In FIG. 5, whether more data segments from other packets are arriving, that is are being sent from media device 350, may be determined 560 by the re-assembly ME. If there are more data segments from other packets arriving, the method may continue starting with receive 505 a new data segment. If there are not any more data segments from other packets arriving, the method may terminate. However, it should be clearly understood that termination here may include, but is not limited to, entering a wait state and completely ending all processing related to the re-assembly of data segments. In accordance with an embodiment of the present invention, the method, generally, will merely enter a wait state until new data segments begin arriving at which time the method will begin receiving 505 the new data segments.

Figure 6:
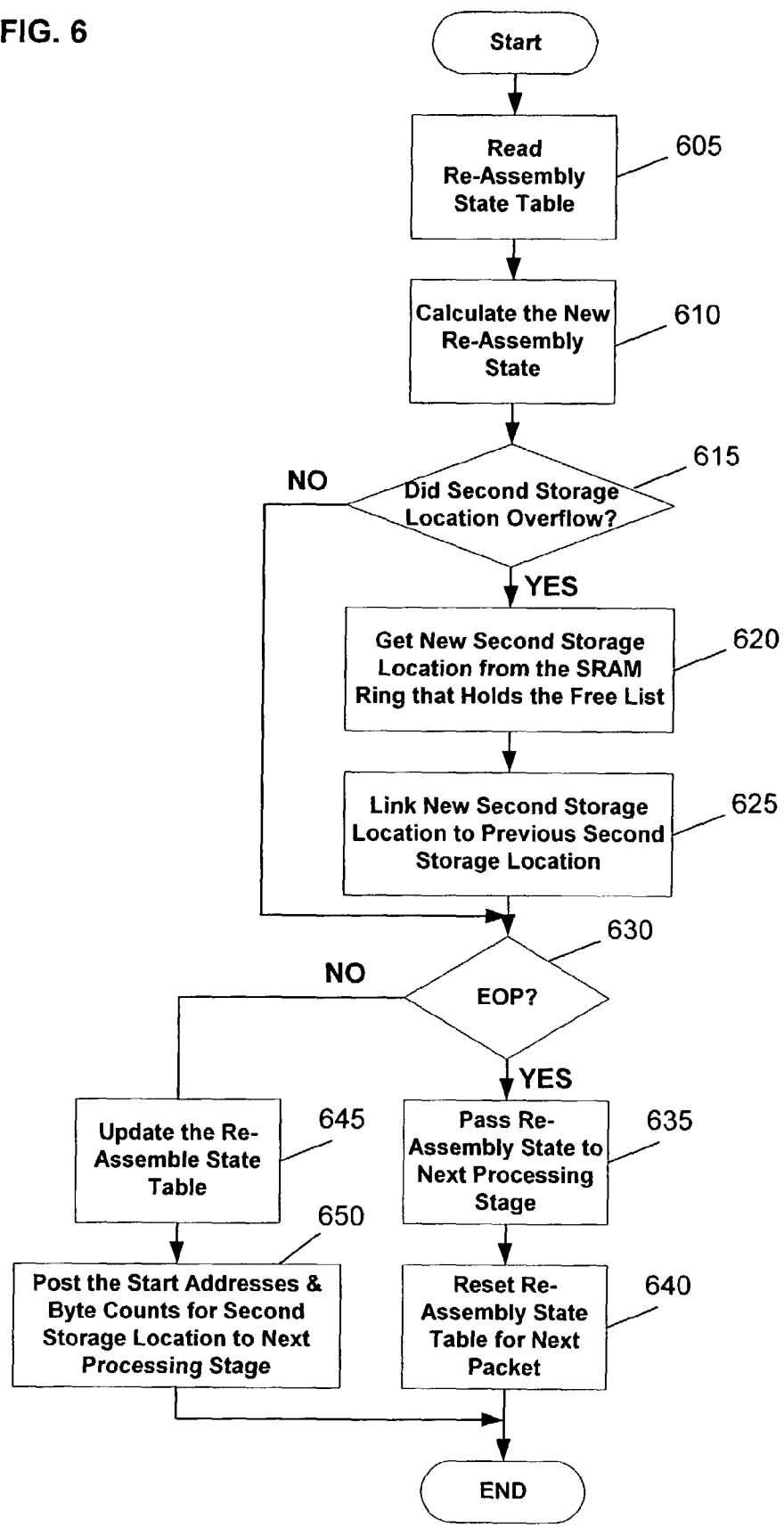
FIG. 6 is a detailed flow diagram of a method of determining if additional buffer memory is needed to store all of the data segments from a packet during re-assembly of the packet, in accordance with an embodiment of the present invention.

FIG. 6 is a detailed flow diagram of a method of determining if additional buffer memory is needed to store all of the data segments from a packet during re-assembly of the packet, in accordance with an embodiment of the present invention. In FIG. 6, the method deals with a Re-Assembly Context Update process, which may be a critical section of the method of FIG. 5 that modifies and updates the re-assembly context and writes the data in the RBUF element to DRAM. Specifically, the critical section starts at block 505 and ends at block 555. In general, managing the re-assembly state involves allocating buffers, and calculating offsets, byte counts, and other variables. As described earlier, the ME CAM may be used to maintain coherency of the re-assembly state between the threads in processing engines 122-1-122-n. In FIG. 6, the pipe-stage program flow is illustrated.

In FIG. 6, in accordance with an embodiment of the present invention, for a thread to use this method, the re-assembly state information must already be in the re-assembly ME's local memory and the thread must figure out where and how much of the network data should be written into a current second storage location. In accordance with an embodiment of the present invention, multiple second storage locations for large packets may be used so that if all the network data does not fit into the buffer, the thread may get additional new second storage locations, as required, place the remaining data into the new second storage locations, and then link the new second storage locations to the previous second storage location. The threads may save the head and tail pointers in the re-assembly state table until the entire packet is received. On receiving an EOP, the thread passes the information to the next processing stage, where it eventually may be forwarded onto a Queue Manager processing stage that will en-queue the packet for transmission from its second storage location.

In FIG. 6, upon receipt of a data segment, the re-assembly state table may be read 605 by the active thread in the re-assembly ME and a new re-assembly state may be calculated 610 by the re-assembly ME. Whether the second storage location will overflow if the new data segment is written to the second storage location may be determined 615. If it was determined 615 that the second storage location would overflow, a new second storage location may be identified 620 from an SRAM ring that holds a free list of available second storage locations and the new second storage location may be linked 625 to the previous second storage location. After linking 625 the new second storage location, or if it was determined 615 that the second storage location would not overflow, whether the data segment to be stored is the EOP may be determined 630. If the data segment is determined 630 to be the EOP, the re-assembly state may be passed 635 to the next processing stage and the re-assembly state table may be re-set 640 for the next packet and the method may terminate.

If the data segment is determined 630 not to be the EOP, the re-assembly state table may be updated 645 to include any new second storage location that may have been added. The start addresses and byte counts for the second storage locations may be posted 650 to the next processing stage and the method may terminate.

Figure 7:
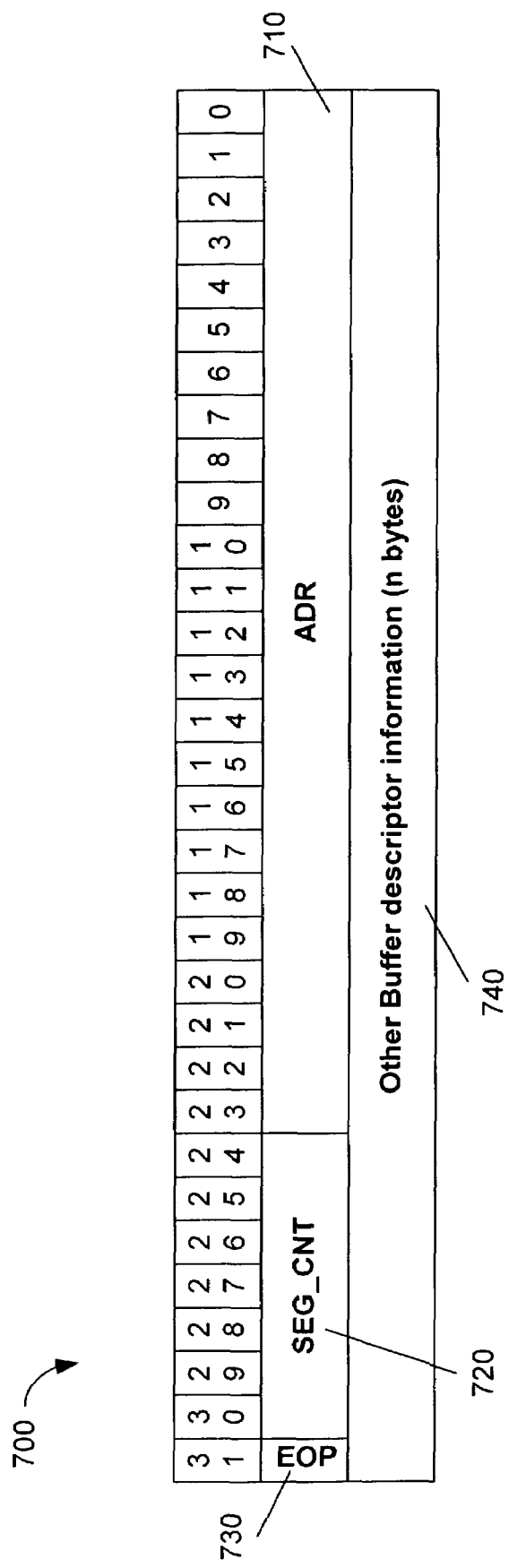
FIG. 7 is an exemplary data structure for a generic data segment, in accordance with an embodiment of the present invention.

FIG. 7 is an exemplary data structure for a generic data segment, in accordance with an embodiment of the present invention. In FIG. 7, a data structure 700 may be implemented with, for example, a 24-bit buffer pointer 710 representing an address, a 7-bit segment count ($seg_{13}$ cnt) 720 and an End-of-Packet (EOP) bit 730 for each buffer in a single 4 byte (32-bit) word. The remainder of the data segment, a buffer descriptor 740, may be application dependent and may vary in size based on the typical amount of data transmitted per transmit request. In the present embodiment, buffer descriptor 740 may be up to 32 bits in length.

In general, the hardware support for dequeue operations may require that the re-assembly threads maintain buffer pointer 710, seg_cnt 720 and EOP bit 730 for each buffer.

In FIG. 7, seg_cnt 720 may specify how many dequeue commands an SRAM controller will receive before the hardware actually performs the dequeue operation on the buffer. In general, the re-assembly threads ensure that the amount of data stored in a buffer is equal to an integer number of data segments. As described above, the number of bytes in a data segment may be programmable and may be typically equal to the amount of data transmitted per transmit request. For example, if the maximum size of the C-frame payload supported is 88 bytes (and the TBUF element is configured to support an entire C-frame, that is the RBUF element size is set to 128 bytes) the data would be placed into the buffer in quantums of 88 bytes. During the transmit process, the QM context pipe-stage may issue dequeue commands to the SRAM Cache Array. When the SRAM Cache Array receives a dequeue command, it may decrement the segment count and may only dequeue the buffer when the segment count becomes 0. In general, each data segment need not contain the maximum byte count allocated to the data segment so cases may be supported where the first data segment in an SOP buffer or the last data segment in an EOP buffer may have less that a complete data segment worth of data.

In FIG. 7, EOP bit 730 may be set on the last data segment of the packet. The SRAM Cache Array uses EOP bit 730 to determine when to decrement a packet counter (pcount), which may be used to indicate the number of packets or buffers (if the EOP bit is set for all buffers) on the queue.

A list of free buffers may be created during system initialization and may be maintained by the SRAM Queue Array using either a linked list or a ring data structure. A linked list may be preferred for system designs that implement multiple buffers per packet because a multi-buffer packet may be discarded by simply enqueuing the entire linked list of buffers to the free list. Single buffer packets may use rings or linked lists. In accordance with an embodiment of the present invention, the SRAM Queue Array may be implemented using a linked list.

In accordance with an embodiment of the present invention, the re-assembly threads may obtain need new buffers by executing an SRAM[dequeue] instruction. In the SRAM [dequeue] instruction the pointer may be used to address the location of the buffer descriptor in SRAM, as well as the data buffer in DRAM. The SRAM enqueue/dequeue hardware, in general, only uses the first 4-byte word of the buffer descriptor and does not use the optional buffer descriptor information. In accordance with an embodiment of the present invention, the first 4-byte word must be maintained in the same SRAM channel as the queue descriptors, but the optional buffer descriptor information may reside on any SRAM channel.

In accordance with an embodiment of the present invention, the re-assembly ME may use a scratch ring to communicate with the classification function processing stage.

In accordance with the embodiment of the present invention, a method for assembling received data segments into full packets in an initial processing stage in a processor includes receiving a plurality of data segments from a packet, determining a first storage location for each of the plurality of data segments, and storing each of the plurality of data segments in its determined first storage location. The method also includes determining a second storage location for each of the plurality of data segments, said second storage locations being logically ordered to represent the order the data segments originally occurred in the packet and storing each of the plurality of data segments in its determined second storage location to reassemble the packet. The method further includes releasing the first storage location associated with each data segment after storing the data segment in its determined second storage location and, upon storing an end of packet data segment from the packet, passing control of the plurality of related data segments to a next processing stage in the processor.

In accordance with an embodiment of the present invention, a computer system includes a memory and a processor coupled to the memory. The processor has at least one processing unit; a receive state machine coupled to the at least one processing unit and the memory; and an external data interface coupled to the receive state machine, the external data interface being configured to receive data packets, and forward a plurality of data segments from the received data packets to the receive state machine. The receive state machine is configured to receive a plurality of data segments from a packet, determine a first storage location for each of the plurality of data segments, and store each of the plurality of data segments in the determined first storage location. In the system, the at least one processing unit is configured to determine a second storage location for each of the plurality of data segments, such that the second storage locations are logically ordered to represent the order the data segments as they originally occurred in the packet. The at least one processing unit is further configured to store each of the plurality of data segments in its determined second storage location to re-assemble the packet and release the first storage location associated with each data segment after storing the data segment in its determined second storage location. Upon the storing of an end of packet data segment from the packet in its determined second storage location, the at least one processing unit is still further configured to pass control of the plurality of related data segments to a next processing stage in the processor.

In accordance with an embodiment of the present invention, a processor includes at least one processing unit; at least one memory controller coupled to the at least one processing unit; and a receive state machine coupled to the at least one processing unit. The at least one memory controller and the receive state machine have an external data interface to receive data packets. The receive state machine is configured to receive a plurality of data segments from a packet, determine a first storage location for each of the plurality of data segments, and store each of the plurality of data segments in its determined first storage location. The at least one processing unit is configured to determine a second storage location for each of the plurality of data segments, such that the second storage locations are logically ordered to represent the order the data segments originally occurred in the packet. The at least one processing unit is further configured to store each of the plurality of data segments in its determined second storage location to re-assemble the packet and release the first storage location associated with each data segment after storing the data segment in its determined second storage location. Upon the storing of an end of packet data segment from the packet in its determined second storage location, the at least one processing unit is still further configured to pass control of the plurality of related data segments to a next processing stage in the processor.

In accordance with an embodiment of the present invention, a machine-readable medium in which is stored one or more instructions adapted to be executed by a processor. The instructions, if executed, configure the processor to receive a plurality of data segments from a packet; determine a first storage location for each of the plurality of data segments; and store each of the plurality of data segments in its determined first storage location. The instructions, if executed, further configure the processor to determine a second storage location for each of the plurality of data segments such that the second storage locations are logically ordered to represent the order the data segments originally occurred in the packet and store each of the plurality of data segments in its determined second storage location to reassemble the packet; and release the first storage location associated with each data segment after storing the data segment in its determined second storage location. The instructions, if executed, further configure the processor to, upon the storing of an end of packet data segment from the packet in its determined second storage location, pass control of the plurality of related data segments to a next processing stage in the processor.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for assembling received data segments into full packets in an initial processing stage in a processor, the method comprising:
    receiving a plurality of data segments from a packet;
    determining a first storage location for each of the plurality of data segments;
    storing each of the plurality of data segments in its determined first storage location;
    determining a second storage location for each of the plurality of data segments, said second storage locations being logically ordered to represent the order the data segments originally occurred in the packet, said determining a second storage location operation comprising:
        obtaining a processing thread from a thread freelist;
        indicating that the obtained processing thread is unavailable;
        associating the processing thread with a status unique to the data segment;
        sending the associated processing thread and unique status to request the second storage location; and
        receiving the second storage location for the data segment;
    storing each of the plurality of data segments in its determined second storage location to reassemble the packet such that the data segments from the packet are stored in the order in which they were in the packet;
    releasing the first storage location associated with each data segment after storing the data segment in its determined second storage location; and
    upon storing an end of packet data segment from the packet in its determined second storage location, passing control of the plurality of related data segments to a next processing stage in the processor.

2. The method as defined in claim 1 wherein said receiving operation comprises:
    receiving the plurality of data segments in serial order.

3. The method as defined in claim 1 wherein said determining a first storage location operation comprises:
    obtaining a first storage location address from a first storage location freelist for each of the plurality of data segments; and
    indicating that each of the obtained first storage location addresses is unavailable.

4. The method as defined in claim 3 wherein said obtaining operation comprises:
    obtaining a buffer address from the first storage location freelist for each of the plurality of data segments.

5. The method as defined in claim 1 wherein said storing each of the plurality of data segments in its determined first storage location operation comprises:
    storing each of the plurality of data segments in the appropriate determined first storage location.

6. The method as defined in claim 5 further comprising:
    creating a status for each of the stored plurality of data segments; and
    storing the status for each of the stored plurality of data segments.

7. The method as defined in claim 1 wherein the second storage locations for the data segments are logically associated so as to enable re-assembly of the purality of data segments into the packet.

8. The method as defined in claim 1 wherein the receiving the storage location operation comprises:
    receiving an address identifying the second storage location for storing the related data segment.

9. The method as defined in claim 1 wherein said releasing operation comprises:
    indicating that an obtained first storage location address associated with each data segment is available.

10. The method as defined in claim 1 wherein said passing control of the plurality of related data segments operation comprises:
    passing a pointer to the plurality of data segments to the next processing stage; and
    indicating that a plurality of processing threads associated with the plurality of data segments are available.

11. A system comprising:
    a memory;
    a processor coupled to said memory, said processor including:
        at least one processing unit;
        a receive state machine coupled to said at least one processing unit and said memory;
        an external data interface coupled to said receive state machine, said external data interface being configured to receive data packets, and forward a plurality of data segments from said received data packets to said receive state machine;
        said receive state machine being configured to receive a plurality of data segments from a packet, determine a first storage location for each of the plurality of data segments, and store each of the plurality of data segments in its determined first storage location;
        said at least one processing unit being configured to determine a second storage location for each of the plurality of data segments, said second storage locations being logically ordered to represent the order the data segments originally occurred in the packet, store each of the plurality of data segments in its determined second storage location to re-assemble the packet such that the data segments from the packet are stored in the order in which they were in the packet, release the first storage location associated with each data segment after storing the data segment in its determined second storage location, and upon the storing of an end of packet data segment from the packet in its determined second storage location, pass control of the plurality of related data segments to a next processing stage in the processor;

a memory controller coupled to said memory;

a push bus coupled to said receive state machine, said at least one processing unit and said memory controller;

a pull bus coupled to said receive state machine, said at least one processing unit and said memory controller;

a command bus coupled to said receive state machine, said at least one processing unit and said memory controller; and a core processing unit coupled to said command bus.

12. The system as defined in claim 11 wherein said at least one processing unit comprises:

a plurality of microengines, each of said plurality of microengines are directly coupled to at least one other of said plurality of microengines.

13. The system as defined in claim 12 wherein said plurality of microengines are implemented in at least two clusters, said at least two clusters are coupled together.

14. The system as defined in claim 11 wherein said at least one processing unit comprises:

a plurality of parallel processors.

15. The system as defined in claim 11 wherein said at least one processing unit comprises:

at least eight microengines, each of said at least eight microengines are directly coupled to at least one other of said at least eight microengines.

16. The system as defined in claim 15 wherein each of said at least eight microengines is an at least 32-bit processor.

17. The system as defined in claim 15 wherein each of said at least eight microengines is a reduced instruction set computing processor.

18. A computer-readable medium in which is stored one or more instructions to be executed by a processor, the instructions, configure the processor to:

receive a plurality of data segments from a packet;

determine a first storage location for each of the plurality of data segments;

store each of the plurality of data segments in its determined first storage location;

determine a second storage location for each of the plurality of data segments, said second storage locations being logically ordered to represent the order the data segments originally occurred in the packet wherein determining a second storage location operation comprises:

obtaining a processing thread from a thread freelist;

indicating that the obtained processing thread is unavailable;

associating the processing thread with a status unique to the data segment;

sending the associated processing thread and unique status to request the second storage location; and receiving the second storage location for the data segment;

store each of the plurality of data segments in its determined second storage location to reassemble the packet such that the data segments from the packet are stored in the order in which they were in the packet;

release the first storage location associated with each data segment after storing the data segment in its determined second storage location; and upon the storing of an end of packet data segment from the packet in its determined second storage location, pass control of the plurality of related data segments to a next processing stage in the processor.

19. The cumpter-readable medium of claim 18 wherein said receive instruction, further configures the processor to:

receive the plurality of data segments in serial order.

20. The cumpter-readable medium of claim 18 wherein said determine a first storage location instruction, further configures the processor to:

obtain a first storage location address from a first storage location freelist for each of the plurality of data segments; and indicate that each of the obtained first storage location addresses is unavailable.

* * * * *

UNITED STATES PATENT AND TRADEMARK OFFICE
CERTIFICATE OF CORRECTION

PATENT NO. : 7,313,140 B2  
APPLICATION NO. : 10/188087  
DATED : December 25, 2007  
INVENTOR(S) : Lakshmanamurthy et al.

It is certified that error appears in the above-identified patent and that said Letters Patent is hereby corrected as shown below:

In column 14, line 22, in Claim 7, delete "purality" and insert -- plurality --, therefor.

In column 16, line 30, in Claim 19, delete "cumpter-readable" and insert -- computer-readable --, therefor.

In column 16, line 34, in Claim 20, delete "cumpter-readable" and insert -- computer-readable --, therefor.

Signed and Sealed this

Eighth Day of July, 2008

JON W. DUDAS  
*Director of the United States Patent and Trademark Office*